United States Patent
Nogami et al.

(10) Patent No.: US 9,693,543 B2
(45) Date of Patent: Jul. 4, 2017

(54) DOUBLE BEARING REEL

(71) Applicant: Globeride, Inc., Tokyo (JP)

(72) Inventors: Masayuki Nogami, Tokyo (JP); Hiroshi Toma, Tokyo (JP); Mikiharu Kobayashi, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 53 days.

(21) Appl. No.: 15/064,861

(22) Filed: Mar. 9, 2016

(65) Prior Publication Data

US 2016/0278354 A1    Sep. 29, 2016

(30) Foreign Application Priority Data

Mar. 24, 2015  (JP) ................. 2015-060397

(51) Int. Cl.
*A01K 89/01*  (2006.01)
*A01K 89/015*  (2006.01)

(52) U.S. Cl.
CPC .................. *A01K 89/01912* (2015.05)

(58) Field of Classification Search
CPC . A01K 89/0192; A01K 89/015; A01K 89/016
See application file for complete search history.

(56) References Cited

U.S. PATENT DOCUMENTS

| | | | | |
|---|---|---|---|---|
| 2,116,581 A | * | 5/1938 | Moor | A01K 89/016 242/296 |
| 2,340,892 A | * | 2/1944 | Maynes | A01K 89/016 242/299 |
| 4,575,024 A | * | 3/1986 | Kaneko | A01K 89/015 242/261 |
| 4,723,727 A | * | 2/1988 | Weber | A01K 89/015 192/69 |
| 5,183,221 A | * | 2/1993 | Kawai | A01K 89/015 242/282 |

(Continued)

FOREIGN PATENT DOCUMENTS

| | | |
|---|---|---|
| JP | 60-49772 | 4/1985 |
| JP | 2004-173520 | 6/2004 |

OTHER PUBLICATIONS

Certification for Application of Provisional of Exception to Lake of Novelty of Invention (from counterpart JP 2015-060397), Apr. 10, 2015.

*Primary Examiner* — Emmanuel M Marcelo
(74) *Attorney, Agent, or Firm* — Pillsbury Winthrop Shaw Pittman, LLP (57) ABSTRACT

A reel body of a double bearing reel according to the invention has a left side plate that has a circular shape as viewed laterally and is situated further from a handle. An outer diameter of a right frame body that serves as another side plate situated closer to the handle is larger than an outer diameter of the left side plate. The reel body includes one or more connecting members that connect the left side plate and the right frame body. Among the connecting members, at least the connecting member that connects the side plates in front of the spool has a planar outer surface facing away from the spool and a curved inner surface facing the spool. The inner surface is formed to be convex outward, and the connecting member is connected to the left side plate through an arc-like bowed portion.

8 Claims, 9 Drawing Sheets

(56) References Cited

U.S. PATENT DOCUMENTS

| | | | | |
|---|---|---|---|---|
| 5,377,925 A * | 1/1995 | Miyazaki | A01K 89/015 | 242/312 |
| 5,489,070 A * | 2/1996 | Puryear | A01K 89/015 | 242/261 |
| 5,743,479 A * | 4/1998 | Miyazaki | A01K 89/015 | 242/310 |
| 6,152,389 A * | 11/2000 | Kim | A01K 89/015 | 242/260 |
| 6,199,782 B1* | 3/2001 | Oishi | A01K 89/015 | 242/290 |
| 2002/0060258 A1* | 5/2002 | Ikuta | A01K 89/015 | 242/310 |
| 2005/0224617 A1* | 10/2005 | Nakagawa | A01K 89/015 | 242/310 |
| 2010/0006688 A1* | 1/2010 | Ikuta | A01K 89/033 | 242/297 |
| 2011/0011968 A1* | 1/2011 | Ikuta | A01K 89/015 | 242/307 |
| 2012/0018562 A1* | 1/2012 | Takamatsu | A01K 89/015 | 242/307 |
| 2012/0056028 A1* | 3/2012 | Kawasaki | A01K 89/033 | 242/267 |
| 2012/0104135 A1* | 5/2012 | Toma | A01K 89/015 | 242/227 |
| 2013/0161433 A1* | 6/2013 | Takechi | A01K 89/033 | 242/243 |
| 2013/0200194 A1* | 8/2013 | Lawson | A01K 89/015 | 242/268 |
| 2014/0231570 A1* | 8/2014 | Ikuta | A01K 89/015 | 242/257 |
| 2014/0291430 A1* | 10/2014 | Takamatsu | A01K 89/006 | 242/283 |
| 2015/0090824 A1* | 4/2015 | Ikebukuro | A01K 89/015 | 242/310 |

\* cited by examiner

DOUBLE BEARING REEL

CROSS-REFERENCE TO RELATED APPLICATIONS

This application is based on and claims the benefit of priority from Japanese Patent Application Serial No. 2015-60397 (filed on Mar. 24, 2015), the contents of which are hereby incorporated by reference in their entirety.

TECHNICAL FIELD

The present disclosure relates to a double bearing reel in which a spool for winding a fishing line is rotatably supported between side plates of a reel body.

BACKGROUND

A conventional reel body of a double bearing reel has a shape in which a portion of the reel body protrudes forward in order to place a level wind device between side plates situated in front of a spool (for example, see Japanese Utility Model Application Publication Sho. 60-49772 (the "772 Publication")). The level wind device is provided for winding a fishing line in parallel on the spool. The left and right side plates of the reel body are formed by attaching outer plates (also referred to as a cover body) on an outer side of a frame plate (also referred to as an inner plate) of a frame. Various components including a winding operation mechanism are placed in a space between the frame plate of the frame and the outer plates.

Recently fishing using lures such as a metal jig and a lubber jig (also referred to as jigging) is performed and the above-described double bearing reel is used for jigging. When the jigging is performed using a double-bearing reel, an angler holds both a fishing rod and a reel body, repeatedly jerks the rod, and winds a line with a handle. Moreover, a jigging angler tends to operate the rod intensely when fighting fish that bites a lure. Therefore it is preferable that the angler can securely hold the reel body and the angler feel less stress even he/she uses the reel for a long period of time.

In this regard, the double bearing reel having the shape disclosed in the "772 Publication" has a protrusion on a side plate situated further from a handle of the reel body so that when an angler do fishing with such a reel, unnecessary movements of a hand of the angler is restricted by the protrusion. However, the holding position and state of the angler is fixed by the protrusion. More specifically, the hand placed on the side situated further from the handle cannot move freely so that the angler is forced to hold the reel and rod tightly during jerking the rod and fighting fish for a long period of time, and consequently the angler may feel pain in hand, which may affect the angler's ability to operate the rod. Meanwhile, it is desired to allow a large amount of fish line to be wound around a spool. However, if the diameter of the spool is increased in order to increase the amount of fish line wound on the spool, the length of the side plate in the front-rear direction is also increased. Consequently a grip performance of the spool may be deteriorated and the weight of the spool is increased.

In order to overcome the above-mentioned problem, developed is a double-bearing reel in which the side plate situated further from the handle is formed in a circular shape as viewed laterally and a level-wind device is not provided (for example, see Japanese Patent Application Publication No. 2004-173520 (the "'520 Publication")). When the side plate situated further from the handle is formed in a circular shape, an angler can move their hand to a different position as necessary while holding the reel with the hand. In this way, operability of the rod when jigging can be improved. Moreover, in the example disclosed in the '520 Publication, a large drive gear is used to wind a line efficiently by a handle. A portion of the side plate provided closer to the handle is not formed in a complete circular shape but has an expanded portion and a portion of the drive gear is provided therein. In this manner, increase of the weight of the reel body is prevented as much as possible.

The double bearing reel as disclosed in the '520 Publication often has a reel body 1 in which an outer diameter of the side plate situated closer to the handle is larger than an outer diameter of the side plate situated further from the handle in order to fit the large drive gear on the side plate situated closer to the handle. More specifically, a winding operation mechanism that transmits a rotational drive force of the handle to a spool, a drag mechanism, a clutch mechanism and the like are placed under the side plate situated closer to the handle. In this case, a connecting member that axially connects the side plate situated closer to the handle and the side plate situated further from the handle generally has a smaller thickness on a side of the side plate situated further from the handle due to the difference in the outer diameter between these side plates and in order to secure a space for a desired outer diameter of the spool (a desired amount of line wound on the spool) placed between the side plates. The smaller thickness of the connecting portion means that the connecting member has a lower rigidity in that portion and this may be a problem in securing a required strength.

Moreover, when an angler uses the double bearing reel without the level wind device as disclosed in the '520 Publication, the angler firstly holds a fishing rod by placing his/her hand on the outer surface of the side plate in the reel body situated further from the handle and placing a thumb pad of the hand on an peripheral edge of the side plate. When the angler tries to wind a fishing line on the spool, the angler moves his/her thumb over the connecting member situated in front of the spool and then moves the thumb left and right along the connecting member to guide the fishing line passing on the connecting member such that the line is uniformly wound (wound in parallel) on the spool. However, in the double bearing reel disclosed in the '520 Publication, the connecting member is formed simply as a pillar that has a substantially rectangular cuboid shape extending in the axial direction. Therefore when an angler moves the thumb from the peripheral edge of the side plate to the connecting member in front of the spool, the thumb may slip during the displacement of the thumb due to a steep drop. In this case, the angler may fail to smoothly transition to a fishing-line guide operation to wind the line on the spool in parallel as retaining the line stably and may fail to securely perform the guide operation.

SUMMARY

In view of the above-mentioned problems, one object of the disclosure is to provide a double bearing reel in which a required strength of the connecting member between the side plates with different outer diameters is secured and the line guide operation performed over the connecting member with a finger of an angler in order to evenly wind the line passing over the connecting member on the spool can be performed without slipping and with a stable retaining force.

According to one aspect of the disclosure, provided is a double bearing reel in which a spool rotatably supported between two side plates of a reel body is rotated by a handle provided on one of the side plates. The side plate situated further from the handle is formed in a circular shape as viewed laterally and an outer diameter of the side plate situated closer to the handle is larger than an outer diameter of the side plate situated further from the handle. The reel body includes at least one connecting member to connect the side plate situated further from the handle and the side plate situated closer to the handle. At least a connecting member that connects the side plates in front of the spool has a planar outer surface facing away from the spool and an inner surface facing the spool, the inner surface is concave, and the connecting member is connected to the side plate situated further from the handle through an arc-like bowed portion.

In the double bearing reel having the above-described configuration, the connecting member that connects the side plates with different diameters has the planar outer surface. When an angler moves his/her hand that holds and retains a fishing rod onto the outer surface of the side plate situated further from the handle in order to hold the reel body, the portions of the connecting member where a finger(s) and heel of the hand touch are made flat. Therefore, it is possible to provide a fine grip performance of the reel body which adequately fits to the hand of the angler. Moreover the connecting member has the inner surface that faces the spool and is concave. Therefore the outer diameter of the spool will not be limited by the existence of the connecting member (a desired outer diameter of the spool (a desired amount of line wound on the spool) can be secured). In addition, the thickness of the end portion of the connecting member situated further from the handle tends to be decreased due to the difference in the outer diameter between the side plates. However, according to the embodiment, it is possible to increase the thickness and thereby it is possible to enhance the rigidity thereof.

This advantageous effect can be further enhanced by connecting the connecting members to the side plate situated further from the handle through the bowed portion that has the arc-like shape. More specifically, the connecting member is connected to the side plate situated further from the handle through the bowed portion, and the bowed portion that is jetty from the left side plate situated further from the handle due to the curved inner surface of the connecting member. As a result, it is possible to secure a large thickness of the side portion of the connecting member on the side further from the handle and thereby it is possible to increase the rigidity.

The bowed portion that is jetty from the side plate situated further from the handle can prevent a finger moved onto the connecting member situated in front of the spool from slipping in the front-rear direction. Consequently it is possible to enhance the grip performance. More specifically, when an angler winds up a fishing line on the spool, the angler firstly holds a fishing rod by placing his/her hand on the outer surface of the side plate of the reel body situated further from the handle and placing a thumb pad of the hand on the peripheral edge of the side plate to hold the reel. When the angler tries to wind the fishing line on the spool, the angler moves his/her thumb over the connecting member situated in front of the spool and then moves the thumb left and right along the connecting member to guide the fishing line passing over the connecting member such that the line is uniformly wound (wound in parallel) on the spool. According to the embodiment, the bowed portion is jetty from the side plate situated further from the handle so that the thumb does not slip in the front-rear direction when the thumb is moved from the peripheral edge of the side plate to the connecting member situated in front of the spool. Consequently, the angler can stably hold the reel during the transition to the line guide operation to wind the fishing-line in parallel on the spool and the angler can perform the fishing-line guide operation stably. In other words, the bowed portion supports the thumb of the hand that holds the reel body in an non-slippery manner (the thumb can firmly hold thereon because the bowed portion supports the thumb in the front rear direction) and the grip performance can be improved. Consequently an angler can perform a jerking operation of the rod smoothly and can reliably fight fish. Moreover the bowed portion allows a fishing line to smoothly contact the connecting member when the line is passing thereover so that the line can be guided to the spool without being damaged.

The connecting member may be provided in the rear of the spool instead of/in addition to in front of the spool. Moreover, the connecting member may be placed any other position. Furthermore, the number of connecting members provided, positions thereof in the reel may not be particularly limited.

It is preferable that the bowed portion of the connecting member have a curved upper surface that is smoothly inclined and connected with a peripheral edge of the side plate situated further from the handle (or/and that is continuous with a chamfered portion that is formed on the peripheral edge of the side plate situated further from the handle and slants toward the spool). In this way, the angler feels comfortable to move his/her finger(s) of the hand that holds the reel body from the peripheral edge of the side plate situated further from the handle to the upper surface of the connecting member situated in front of the spool and can smoothly shift to the fishing-line guide operation performed by the finger.

Moreover, it is preferable that at least an upper surface of the connecting member have a curved shape in which a central portion sags with respect to side portions of the connecting member connected to the side plates. When the upper surface of the connecting member has the U-curved shape in which the central portion sags with respect to the side portions, it is possible to effectively prevent the finger from slipping on the connecting member when the angler repeatedly moves the finger in the left-right direction along the connecting member to perform the fishing-line guide operation to wind the line in parallel on the spool. Furthermore the angler can know the position of the finger through touch (a contact area of the finger and a pressure on the finger) so that the angler can accurately guide the fishing line with the finger when the line is wound on the spool. The upper surface having the U shape can prevent the fishing line from hitting hard thereon and allows the fishing line to be guided smoothly to the spool without being damaged when the line is wound on the spool in parallel.

It is preferable that the connecting member have an upper surface and a lower surface with the curved shape in which a width of the central portion in an upper-lower direction is smaller than a width of the side portions in the upper-lower direction. Although the thickness of the side portion of the connecting member situated further from the handle tends to be decreased due to the difference in the outer diameter between the side plates, according to the embodiment, it is possible to increase the thickness and thereby it is possible to enhance the rigidity thereof and easily realize the curved upper surface that has the above-mentioned advantageous effect.

It is also preferable that the upper surface of the connecting member have a chamfered portion that slants toward the outer surface and/or the inner surface. Consequently an angler's finger feels comfortable touching the upper surface when performing the line guide operation to wind the line in parallel on the spool, and the angler will not be tired or feel pain even when he/she performs the guide operation for a long period of time.

Furthermore, it is preferable that the reel body be configured without a level wind device for winding a fishing-line on the spool in parallel, and a winding operation mechanism that transmits a rotational force of the handle to the spool be provided on the side plate situated closer to the handle. When the mechanisms are collectively placed under the side plate situated closer to the handle, the side plate situated further from the handle may be made thinner. Consequently it is possible to easily realize a high grip performance of the reel and a fine fitting feeling of a palm on the side of the reel situated further from the handle.

According to the embodiments of the disclosure, it is possible to obtain a double bearing reel in which a required strength of the connecting member between the side plates with different outer diameters is secured and the line guiding operation performed on the connecting member with a finger of an angler in order to evenly wind the line passing over the connecting member on the spool can be performed without slipping and with a stable retaining force.

BRIEF DESCRIPTION OF THE DRAWINGS

FIG. 8b is a sectional view of the frame along the line A-A in FIG. 8a.

DESCRIPTION OF THE PREFERRED EMBODIMENTS

A double bearing reel according to one embodiment of the disclosure will be now described with reference to FIGS. 1 to 9. The front-rear direction and the left-right direction hereunder referred are defined as the directions shown in FIG. 1 and the upper-lower direction hereunder referred is defined as the direction shown in FIG. 2.

The double bearing reel according to the embodiment is configured appropriate for jigging without a level wind device for winding a fishing line in parallel on a spool. A reel body 1 may include a left side plate 1A, a right side plate 1B, and a spool 3 rotatably supported between the side plates 1A and 1B. In the embodiment, a handle 5 may be provided on the right side plate 1B side (a right handle type). The spool 3 is rotated by a winding operation of the handle 5.

Figure 6:
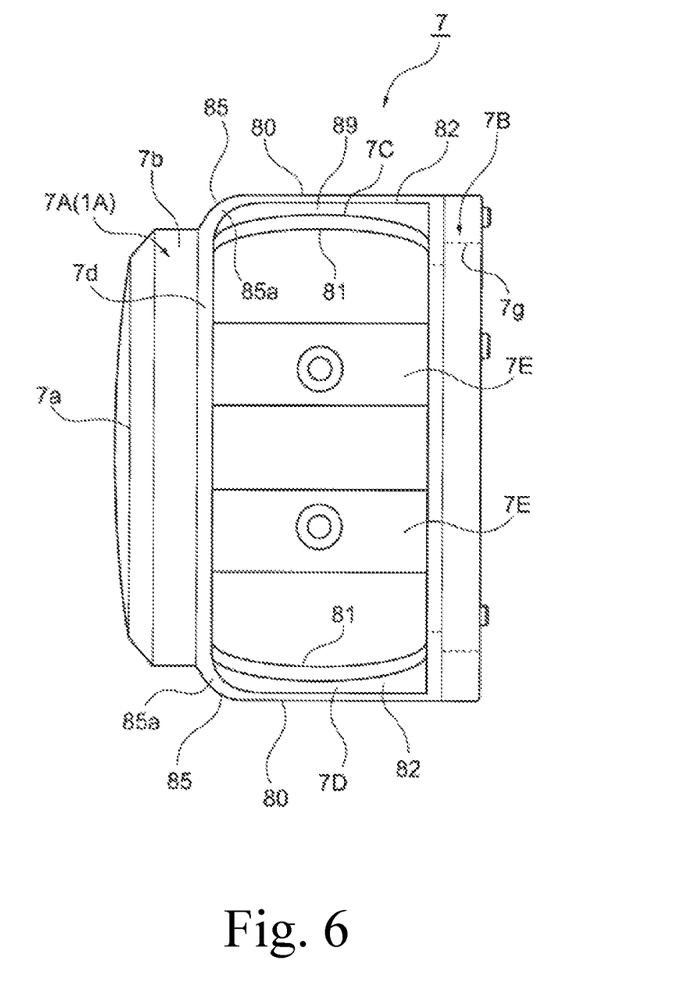
FIG. 6 is a plan view of a frame of a reel body of the double bearing reel of FIG. 1.
Figure 7:
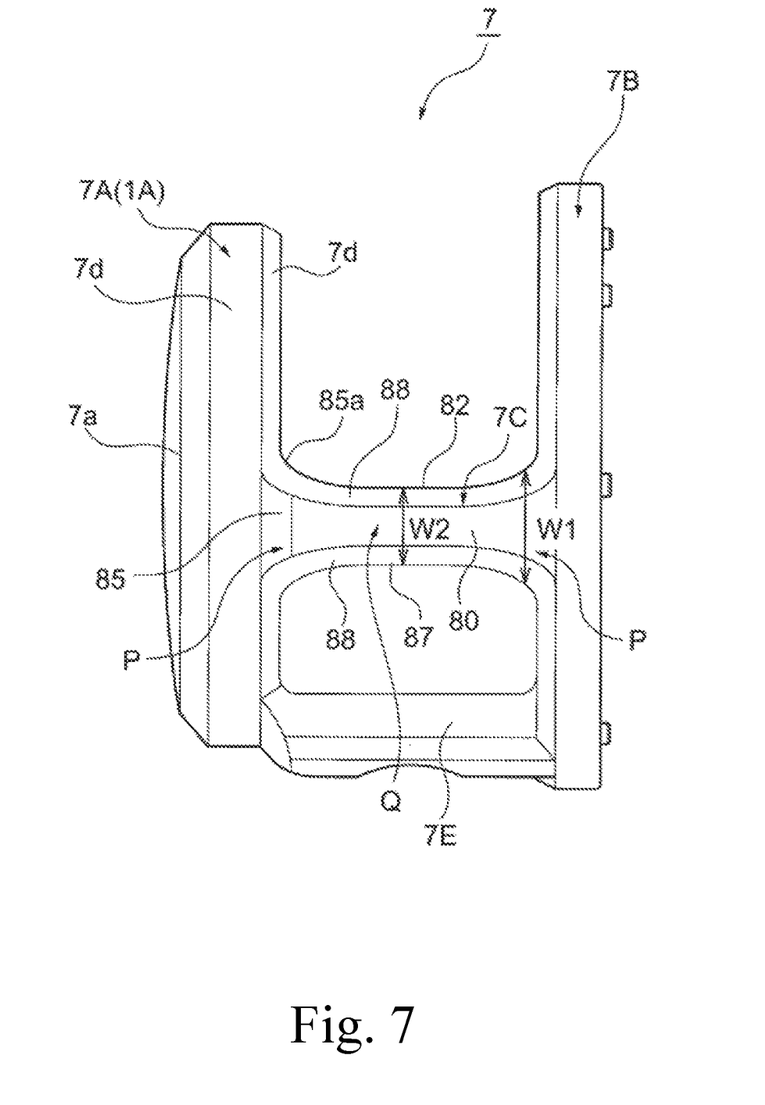
FIG. 7 is an elevation view of the frame of FIG. 6 as viewed from the front.

The reel body 1 may further include a frame 7 that includes the left and right side plates 1A and 1B. The frame 7 may be formed as a single body of a metal material such as an aluminum alloy. The frame includes the left side plate 1A (the side plate situated further from the handle) and the right side plate 1B with a cover 15 attached thereon. In other words, the frame 7 has a left side plate 7A and a right frame body 7B as illustrated in FIGS. 6 and 7. The left side plate 7A serves as the left side plate 1A, and the right frame body 7B together with the cover 15 serves as the right side plate 1B. Note that configuration of the side plates 1A, 1B is not limited to this frame structure.

In the frame structure as one example, the frame 7 may include connecting members that connect the left side plate 7A and the right frame member 7B. In the embodiment, provided are a front connecting member 7C situated in front of the spool 3, a rear connecting member 7D situated in rear of the spool 3, and two lower connecting members 7E situated adjacent to each other below the spool 3. These connecting members may be formed integrally with the left side plate 7A and the right frame body 7B. A reel leg 8 that is to be attached to a reel seat of a fishing rod is fixed on the lower connecting members 7E (the reel leg may be formed integrally with the frame 7). In the embodiment, the right frame body 7B is formed in a ring shape with an opening 7g (see FIG. 6 and FIG. 8a) such that the spool 3 can be inserted from the right side to be attached or detached to/from the frame. Alternatively, the right frame body may be formed in any other shape.

Figure 1:
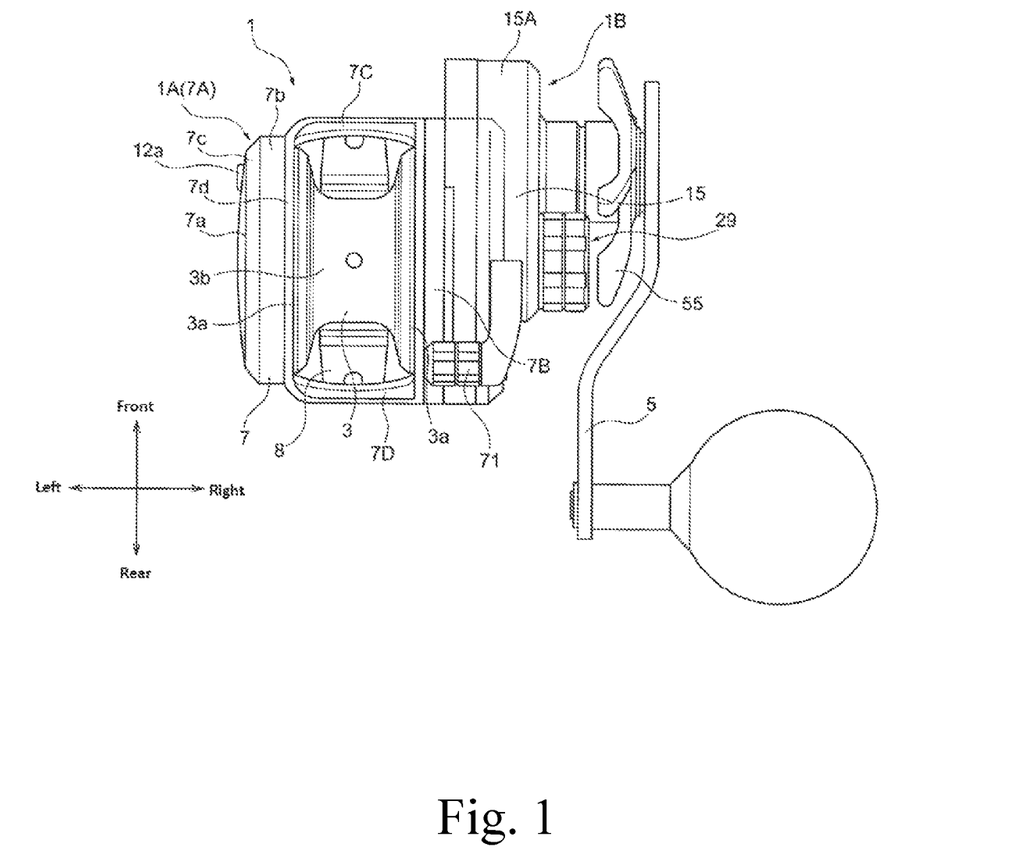
FIG. 1 is a plan view of a double bearing reel according to one embodiment of the disclosure.
Figure 2:
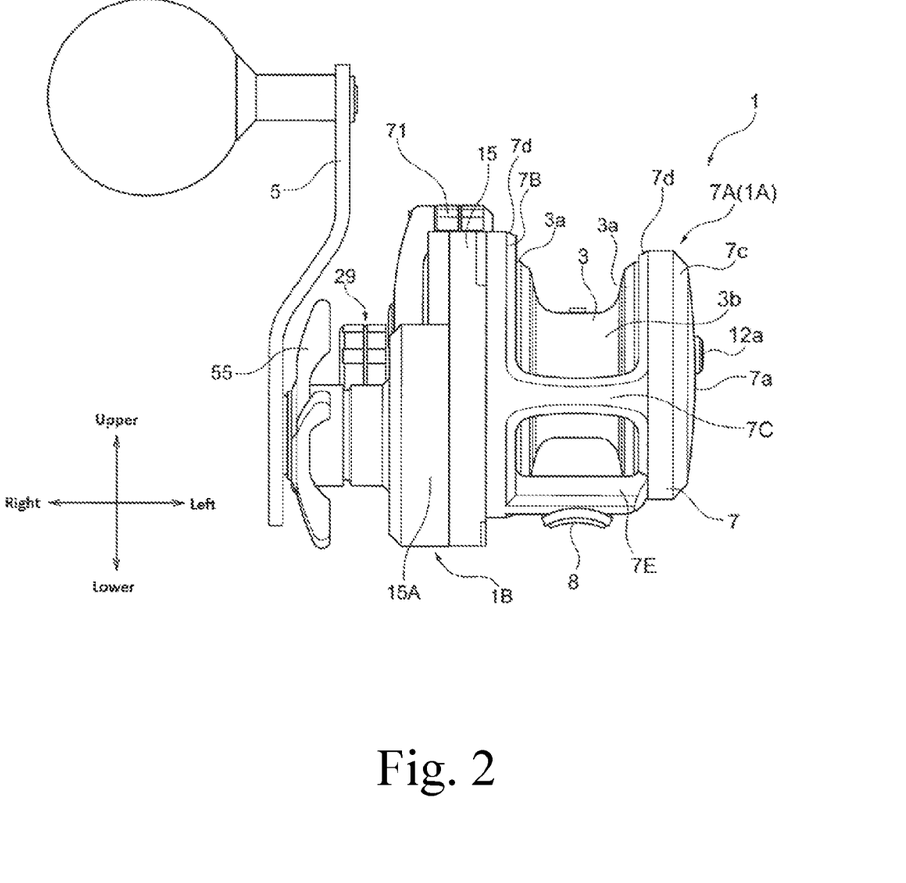
FIG. 2 is a front elevation view of the double bearing reel of FIG. 1.
Figure 3:
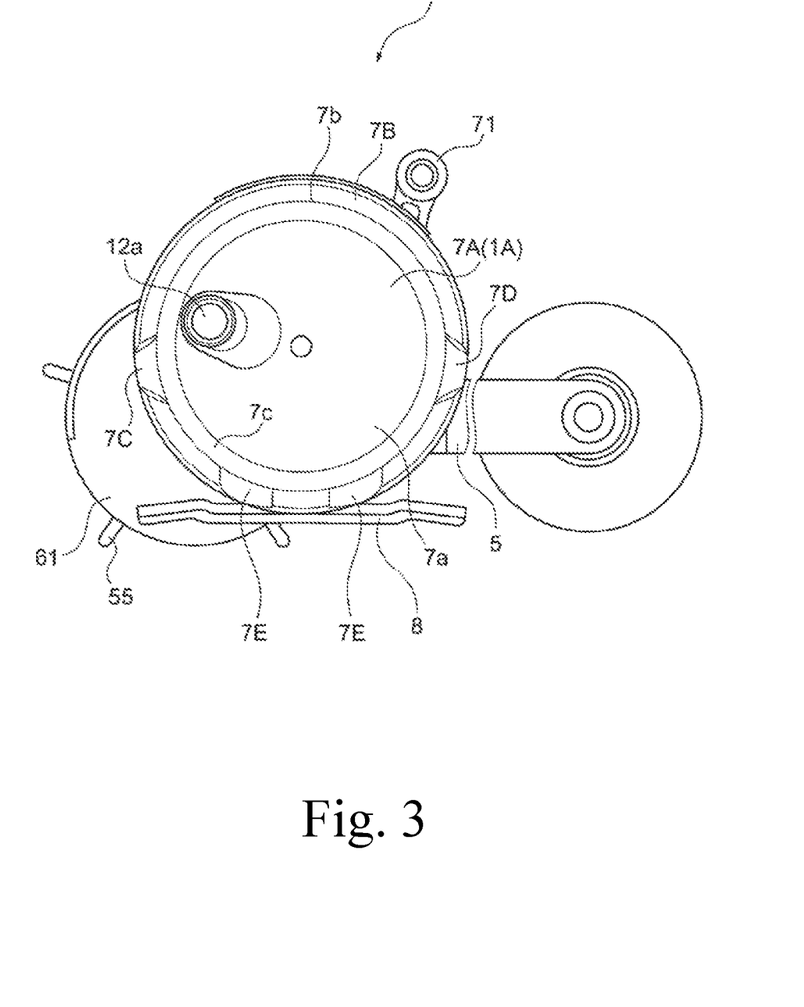
FIG. 3 is a left lateral view of the double bearing reel of FIG. 1 showing a side where a handle is not provided.

Referring to FIG. 3, the outer shape of the left side plate 7A of the frame 7 may be formed in a circular shape as viewed laterally. The left side plate 7A may have a substantially cylindrical solid body and the thickness of the left side plate is decreased as much as possible. A palm of a hand holding the fishing rod touches an outer surface 7a of the left side plate 7A. A thumb of the hand is placed and retained on a peripheral edge (circumferential edge) 7b of the left side plate 7A. In the embodiment, in order to enhance a grip performance (a feel of the side plate when the palm touches there), the outer surface 7a may slightly bulge in the axial direction (see FIGS. 1, 2, 6, and 7). Moreover, a circumference taper 7c may be formed to extend from the outer side of the peripheral edge 7b to the outer surface 7a. The circumference taper 7c may be angled such that the thumb placed on the peripheral edge 7b feels comfortable with the outer surface 7a. A chamfered portion 7d is formed to extend from the inner side (a side closer to the spool 3) of the peripheral edge 7b to a flange 3a of the spool 3 adjacent to the left side plate 7A in order to enhance a smooth transition of the thumb placed on the peripheral edge 7h to a thumbing operation. The chamfered portion 7d may be angled from the peripheral edge 7b to the flange 3a.

Figure 5:
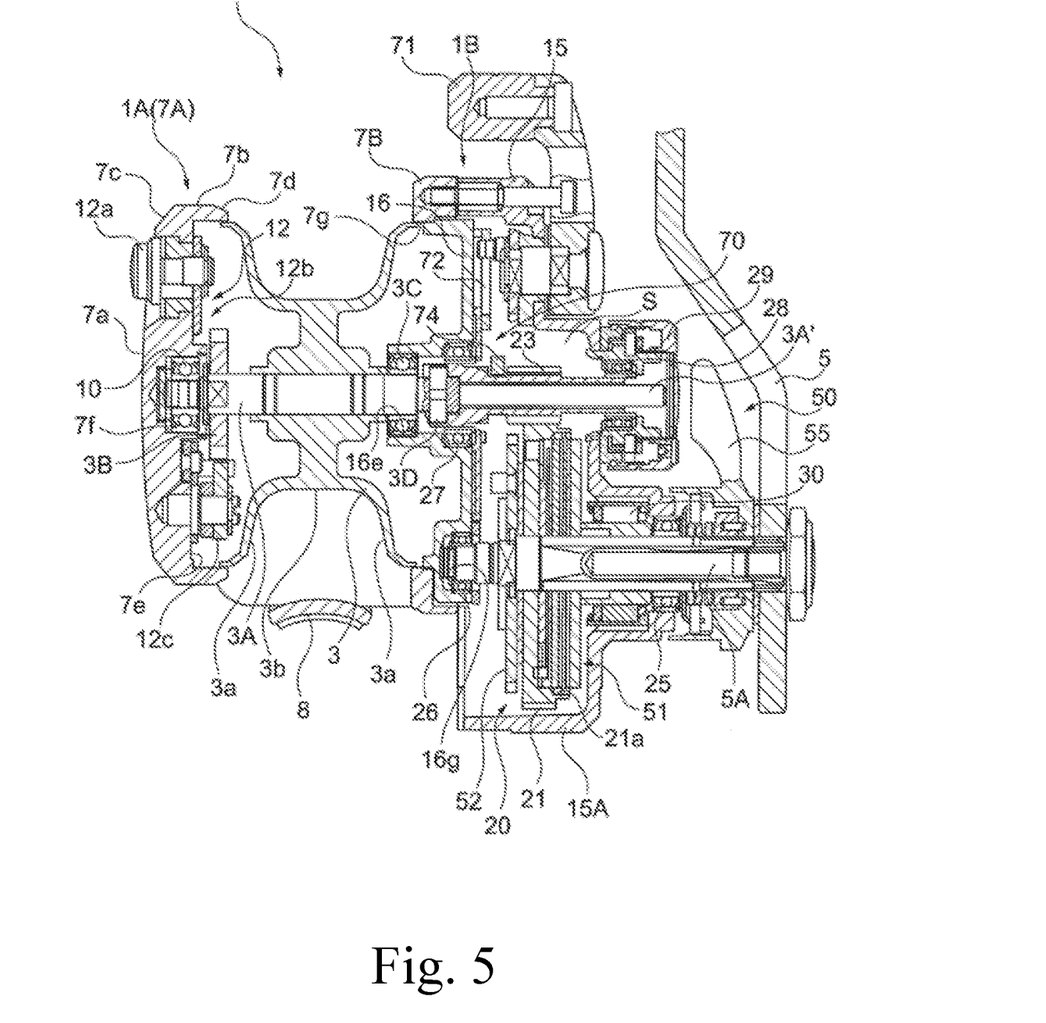
FIG. 5 is a sectional view of the double bearing reel of FIG. 1.

Referring to FIG. 5, an annular concave portion 7e where the flange 3a of the spool 3 is housed may be formed in the left side plate 7A (an inner diameter of the concave portion 7e may be slightly larger than an outer diameter of the flange 3a of the spool 3). Moreover, a concave portion 7f may be formed in a central region of the left side plate 7A. A bearing 10 is placed in the concave portion 7f to rotatably support a left end of a drive shaft 3A of the spool 3.

A common spool stopper 12 for stopping rotation of the spool 3 in a fishing-line releasing direction may be further provided within the left side plate 7A according to the embodiment. The spool stopper 12 may include a slide lever 12a that projects out from the outer surface 7a of the left side plate 7A, a link mechanism 12b that is moved by a sliding operation of the slid lever 12a, and a stopper 12c coupled to the link mechanism 12b and engaged or disengaged with a ratchet 3B that is unrotatably fixed on the drive shaft 3A of the spool 3. The spool stopper 12 configured in the above-describe manner allows switching between a state where the stopper 12c is engaged with the ratchet 3B to stop the rotation of the spool 3 in the fishing-line releasing direction and a state where the stopper 12c is disengaged from the ratchet 3B to allow the spool 3 to rotate in the fishing-line releasing direction by sliding the slide lever 12a.

The ring-shaped right frame body 7B may be formed in a circular shape as viewed laterally in the same manner as the left side plate 7A. The outer diameter of the right frame body 7B may be larger than the outer diameter of the left side plate 7A. More specifically, in order to house a winding operation mechanism that transmits a rotational drive force of the handle to the spool, a drag mechanism, a clutch mechanism and the like under the side plate 1B situated closer to the handle, the outer diameter of the right side plate 1B (the right frame body 7B) is larger than the outer diameter of the left side plate 1A (7A) in the reel body 1.

The spool 3 may include a fishing-line winding body 3b on which a fishing line is wound, and the flange 3a provided in each side of the fishing-line winding body 3b adjacent to the left side plate 7A. The amount of line wound on the fishing-line winding body 3b is defined by the flanges 3a. At the center of the spool 3, the drive shaft 3A may be inserted and fixed thereon. The ratchet 3B may be unrotatably fixed on the drive shaft 3A on the left side of the spool 3. The left-side end of the drive shaft 3A may be rotatably supported through the bearing 10 on the left side plate 1A (the left side plate 7A of the frame 7). A bearing 3C may be provided on the drive shaft 3A on the right side of the spool 3. A pin 3D in which a pinion gear 23 is engaged and disengaged may be further provided at axially outer from the bearing 3C. The pinion gear 23 slides in the axial direction by a clutch mechanism which will be later described. A diameter of a portion of the drive shaft 3A situated closer to the handle 5 from the pin 3D may be made smaller to be inserted in the pinion gear 23 (this portion with a smaller diameter inserted through the pinion gear 23 will be hereunder referred to as a drive shaft 3A').

Figure 4:
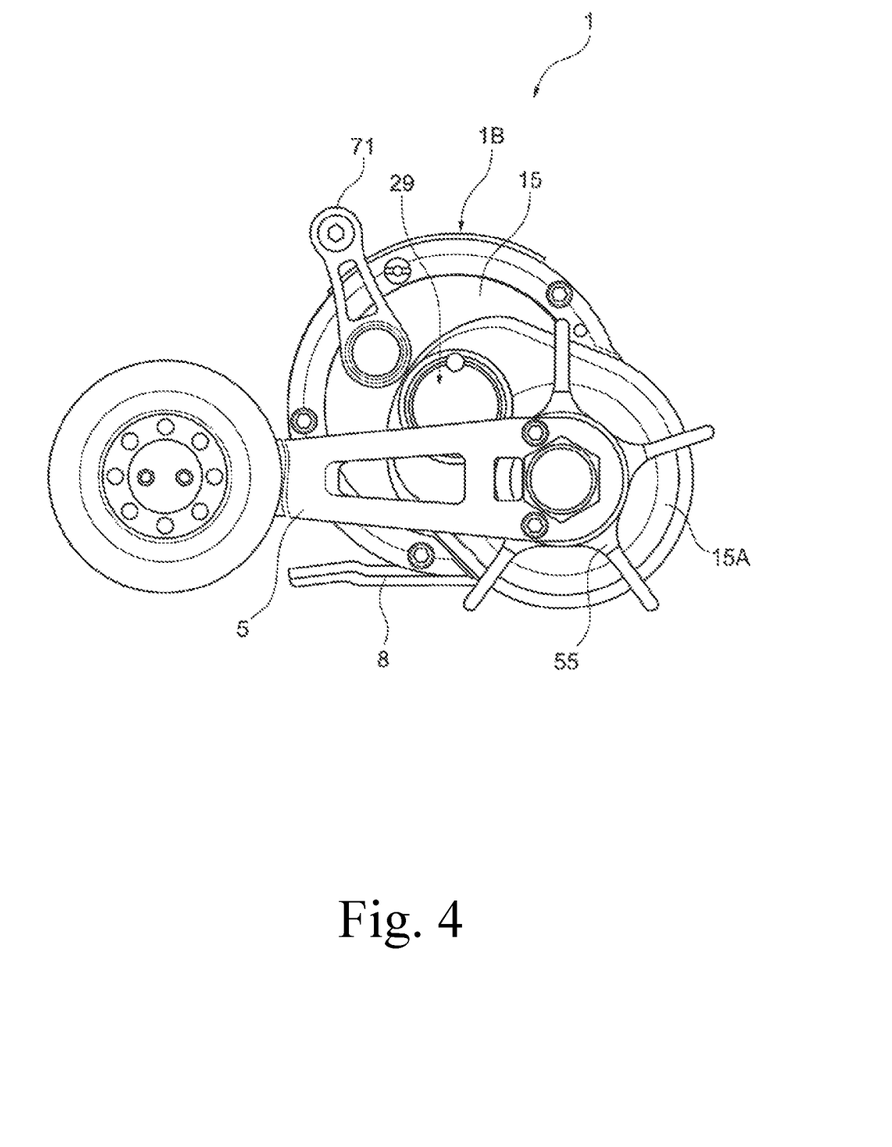
FIG. 4 is a right lateral view of the double bearing reel of FIG. 1 showing a side where a handle is provided.

The cover 15 may be detachably fixed on the right frame body 7B of the frame 7. The right frame body 7B and the cover 15 together form the right side plate 1B of the reel body 1. The cover 15 may have a U-shape that creates a storage space S with the right frame body 7B. Various components may be placed within the storage space S. The cover 15 may have a generally circular shape as viewed laterally. In order to enhance the winding efficiency of the handle 5, a large drive gear may be used for a handle shaft 5A. Referring to FIG. 4, in order to house the large drive gear, an expanded portion 15A that protrudes partially in a substantially semicircular shape is formed in the cover 15.

The various components housed in the storage space S will be now described.

As mentioned above, within the storage space S, a winding operation mechanism 20 that transmits a rotational drive force of the handle 5 to the spool 3, a drag mechanism 50 that imparts a desired braking force to a fishing line released from the spool 3, and a clutch mechanism 70 that switches the state of the spool 3 between a line winding state/a free rotation state may be provided. In this embodiment, the storage space S may be formed between the cover 15 and a supporting member 16 (which may be also referred to as a set plate) attached to the cover 15, and the above-mentioned mechanisms are placed within the storage space S.

Here, configuration of the winding operation mechanism 20 will be now described.

As mentioned above, the handle 5 that rotates the spool 3 may be provided on the side of the right side plate 1B in the embodiment. The winding operation mechanism 20 may be placed in the storage space S between the supporting member 16 and the cover 15. The winding operation mechanism 20 may include the handle shaft 5A on which the handle 5 is attached, a drive gear 21 rotatably attached on the handle shaft 5A, and the pinion gear 23 meshed with the drive gear 21.

The handle 5 is attached on the end of the handle shaft 5A for winding operation. The handle shaft 5A may be rotatably supported with respect to the right side plate 1B through a bearing 25 provided between the handle shaft 5A and the cover 15 and through a bearing 25 provided between the handle shaft and a dent 16g formed in the right frame body 7B. The drive gear 3A' of the spool 3 is inserted through the pinion gear 23 meshing with the drive gear 21, and the pinion gear 21 may be slidable on the drive gear 3A' in the axial direction. In the embodiment, each side of the pinion gear 23 may be rotatably supported by bearings 27, 28 respectively. In this case, the bearing 27 is provided in a through-hole 16e in the supporting member 16. The bearing 28 is provided in a common braking device 29 that is attached to the cover 15, touches the end surface of the drive shaft 3A' of the spool, and imparts a braking force to rotation of the spool.

A one-way clutch 30 is provided on the handle shaft 5A between the cover 15 and the handle shaft 5A in order to allow the handle 5 to rotate in the fishing-line winding direction but to prevent reverse-rotation of the handle 5. Furthermore, on the handle shaft 5A, a common drag mechanism 50 that imparts a desired braking force to a fishing line released from the spool 3 may be provided. The drag mechanism 50 may include a plurality of braking plates 51 that is provided in an annular concave portion 21a formed in the drive gear 21, a ratchet gear 52 that is unrotatably and immovably fixed on the handle shaft 5A to face the drive gear 21, and an operation knob 55 that is provided on the handle shaft 5A and is moved in the axial direction by a rotational operation. When the operation knob 55 is rotationally operated, the braking plates 51 are pressed through an inner ring of the one-way clutch 30 and a desired amount of pressure may be imparted between the drive gear 21 and the handle shaft 5A. Therefore, the pressure on the braking plates 51 may be adjusted by rotating the operation knob 55 to put a desired dragging force on the fishing line released from the spool 3.

The ratchet gear 52 is configured such that a hook (not shown) can be engaged therewith and therefore even when a backstop of the one-way clutch 30 slips, the reverse-rotation of the handle 5A is securely prevented.

A common clutch mechanism 70 that switches the state of the spool 3 between a line winding state/a free rotation state is provided on the supporting member 16. The clutch mechanism 70 may include an operation member 71 that is rotatably supported on the right side plate 1B along the outer periphery of the right side plate, a clutch plate 72 that is rotatably supported by the supporting member 16 and rotated when the operation member 71 is operated, and an engaging member 74 that is engaged in a circumferential groove formed on an outer periphery of the pinion gear 23 to make the pinion gear 23 slide in the axial direction in accordance with the rotational operation of the clutch plate 71. More specifically, the pinion gear 23 is slid in the axial direction by operating the operating member 71 to engage/disengage an end portion 23b of the pinion gear 23 having a sectional non-circular shape with/from the pin 3D provided on the drive shaft 3A of the spool 3A. In this manner, it is possible to switch between a drive-force transmitted state (a clutch ON state) and a drive-force shutoff state (a clutch OFF state). In this case, a return mechanism that automatically returns the clutch mechanism 70 from the OFF state to the ON state when the handle 5 is operated to wind the fishing line may be provided on the ratchet gear 52 and the supporting member 16.

As described above, the cover 15 has the expanded portion 15A protruding out in a substantially semicircular shape in order to house a part of the drive gear 21 attached to the handle shaft 5A. A stuffing member 61 (see FIG. 3) that is formed in a substantially semicircular shape and screwed on the right frame body 7B may be fitted in the expanded portion. More specifically, when the cover 15 that includes the supporting member 16 is attached to the right frame body 7B, the stuffing member 61 attached to the right frame body 7B fits in the expanded portion 15A.

The rear connecting member 7C that connects the left side plate 7A with the right frame body 7B (the connecting portion that connects the side plates (the left side plate 7A and the right frame body 7B in the embodiment) in front of the spool 3), the rear connecting member 7D (the connecting portion that connects the side plates (the left side plate 7A and the right frame body 7B in the embodiment) in rear of the spool 3) will be now described in detail with reference to FIGS. 6 to 8.

Figure 8A:
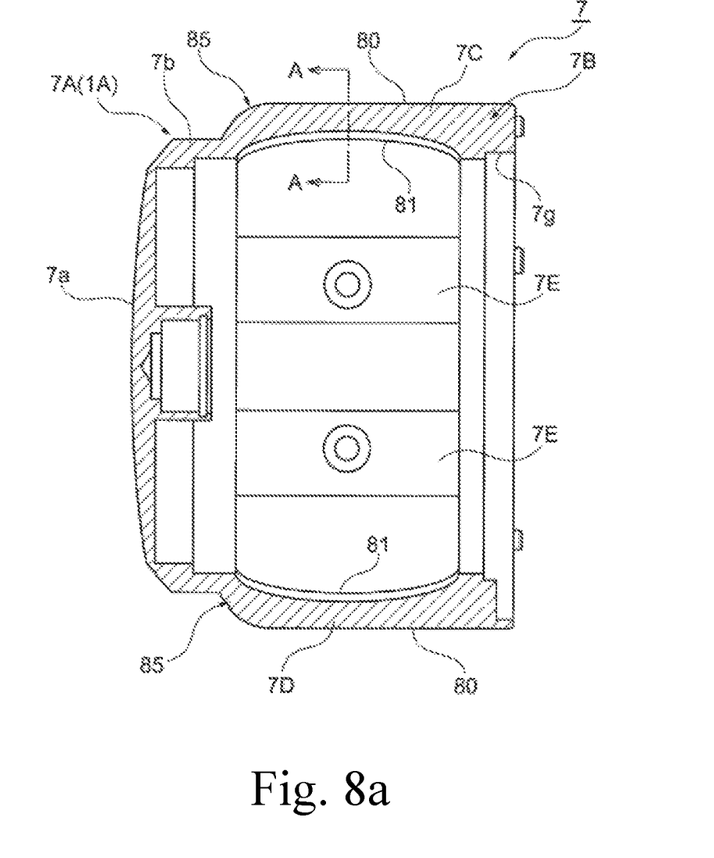
FIG. 8a is a cross-sectional view of the frame of FIG. 6 (a section in the front-rear direction).
Figure 8B:
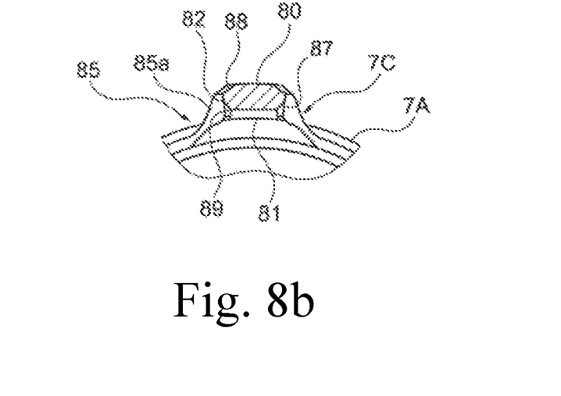

Referring to FIGS. 6 to 8, the connecting members 7C, 7D may have planar outer surfaces 80 facing away from the spool 3 (the outer surface situated radially outer and where a hand holding the reel body may touch). The connecting members 7C, 7D may also have inner surfaces 81 facing the spool 3. The inner surfaces 81 may be formed in an outwardly-curved shape. The connecting members 7C, 7D may be connected to the left side plate 7A situated further from the handle through bowed portions 85 that have an arc-like shape. More specifically, the connecting members 7C, 7D may be arranged at each side in the front-rear direction so as to face each other. The outer surface 80 of each connecting member is configured to level with the peripheral edge of the right frame body 7B that has a larger diameter and extend straight in the axial direction to the left side plate 7A that has a smaller diameter (extend along a plane parallel to the drive shaft 3A of the spool 3) and then extend radially inward from the front to the rear direction (the rear to the front direction in case of the rear connecting member 7D) with the bowed portion 85 to be coupled with the peripheral edge 7b of the left side plate 7A that has the smaller diameter. A radius of curvature of the bowed portion 85 may be, for example, 3 to 10 mm.

In this case, the bowed portion 85 may have a curved upper surface 85a that is smoothly inclined and connected with the peripheral edge 7b of the left side plate 7A. More specifically, the upper surface 85a may incline toward and be continues with the chamfered portion 7d that is formed on the peripheral edge 7b of the left side plate 7A to be slanted toward the spool 3. Alternatively the upper surface 85a may be provided only on the front connecting member 7C where is touched by a finger that guides a fishing line to be wound in parallel.

The upper surface 82 of each of the connecting members 7C, 7D that is continuous with the upper surface 85a of the bowed portion 85 may have a curved shape in which a central portion Q sags with respect to side portions P connected to the side plates (here, the left side plate 7A and the right frame body 7B) as shown in FIG. 7. In particular, the upper surfaces 82 and the lower surfaces 87 of the connecting members 7C, 7D have the above-described curved shape in which the central portion is recessed. Accordingly, the connecting members 7C, 7D respectively have the width W2 of the central portion Q in the upper-lower direction is smaller than the width W1 of the side portions P in the upper-lower direction. For example, the width W1 may be 10 to 18 mm, and the width W2 may be 4 to 10 mm (a difference between the width W1 and the width W2 is preferably set to 6 to 8 mm).

Moreover, the upper surface 82 (also the lower surface 87 in the embodiment) of the connecting members 7C, 7D may have a chamfered portion 88 inclined toward the outer surface 80 and a chamfered portion 89 inclined toward the inner surface 81 (see FIGS. 7 and 8). In this case, the inclination angle of the chamfered portion 88, 89 from the upper surface 82 is preferably set to 30° to 70°.

In the double bearing reel according to the embodiment as described above, the connecting members 7C, 7D connecting the side plates with different diameters (here, the left side plate A and the right frame body 7B) each have the planar outer surface 80. When an angler moves his/her hand that holds and retains a fishing rod onto the outer surface 7a of the side plate 7A situated further from the handle in order to hold the reel body 1, the portions 80 of the connecting members 7C, 7D where fingers and heel of the hand touch are made flat. Therefore, it is possible to provide a fine grip performance of the reel body 1 which adequately fits to the hand of the angler. Moreover the connecting members 7C, 7D each has the inner surface 81 that faces the spool 3 and is concave. Therefore the outer diameter of the spool 3 will not be limited by the existence of the connecting members 7C, 7D (a desired outer diameter of the spool 3 (a desired amount of line wound on the spool) can be secured). In addition, the thickness of the end portion of the connecting members 7C, 7D situated further from the handle tends to be decreased due to the difference in the outer diameter between the side plates 1A, 1B (the difference between the left side plate 7A and the right frame body 7B). However, according to the embodiment, it is possible to increase the thickness and thereby it is possible to enhance the rigidity thereof.

This advantageous effect can be further enhanced by connecting the connecting members 7C, 7D to the left side plate 7A through the bowed portions 85 that have the arc-like shape. More specifically, the connecting members 7C, 7D are connected to the left side plate 7A through the bowed portion 85, and the bowed portions 85 extend forward (or backward) from the left side plate 7A due to the curved inner surface 81 of the connecting members 7C, 7D. As a result, it is possible to secure the large thickness of the connecting members 7C, 7D on the side further from the handle and thereby it is possible to increase the rigidity.

Figure 9:
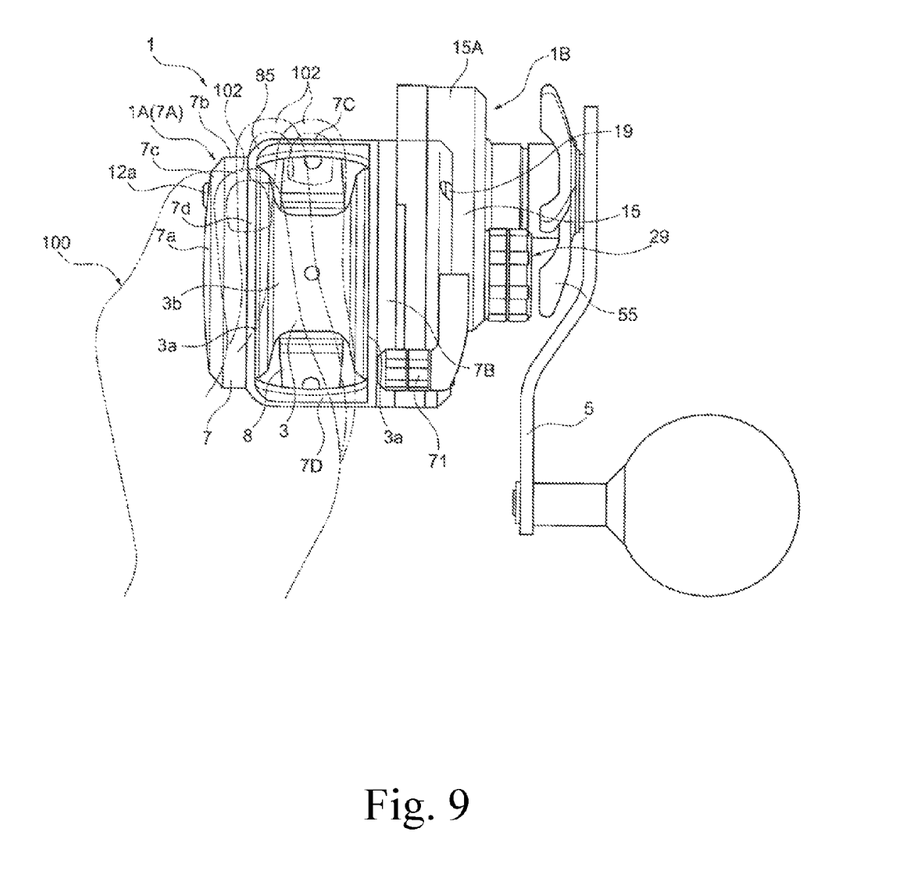
FIG. 9 is a plan view of the double bearing reel of FIG. 1 illustrating a process in which a thumb of a hand holding a side plate of the reel body situated further from the handle is moved from a peripheral edge of the side plate to an upper surface of a connecting member in front of a spool by alternate long and two short dashes lines.

The bowed portions 85 that jetty from the left side plate 7A can prevent the finger moved on to the connecting member 7C situated in front of the spool 3 from slipping in the front-rear direction. Consequently it is possible to enhance the grip performance. Moreover, when an angler winds up a fishing line on the spool 3, the angler firstly holds a fishing rod by placing his/her hand 100 on the outer surface 7a of the left side plate 7A of the reel body 1 and placing a thumb pad 102 of the hand 100 on the peripheral edge 7b of the side plate 7A to hold the reel as illustrated in FIG. 9.

When the angler tries to wind the fishing line on the spool, the angler moves his/her thumb 102 over the front connecting member 7C situated in front of the spool and then moves the thumb left and right along the connecting member 7C to guide the fishing line passing over the connecting member 7C such that the line is uniformly wound (wound in parallel) on the spool 3. According to the embodiment, the bowed portions 85 jetty from the left side plate 7A so that the thumb 102 does not slip in the front-rear direction when the thumb 102 is moved from the peripheral edge 7b of the side plate 7A to the connecting member 7C situated in front of the spool. Consequently, the angler can stably hold the reel during the transition to the line guide operation to wind the fishing-line in parallel on the spool 3 (see the alternate long and two short dashes lines in FIG. 9) and the angler can perform the fishing-line guide operation stably. In other words, the bowed portions 85 support the thumb 102 of the hand 100 that holds the reel body 1 in an non-slippery manner (the thumb 102 can firmly hold thereon because the bowed portions 85 support the thumb in the front rear direction) and the grip performance can be improved. Consequently an angler can perform a jerking operation of the rod smoothly and can reliably fight fish. Moreover the bowed portions 85 allow a fishing line to smoothly contact the connecting member 7C when the line is passing thereover so that the line can be guided to the spool without being damaged.

Furthermore, in the embodiment, the bowed portion 85 of the connecting member 7C has the curved upper surface 85a that is smoothly inclined and connected with the peripheral edge 7b of the left side plate 7A (the chamfered portion 7d in the embodiment). Therefore the angler feels comfortable to move his/her finger(s) of the hand that holds the reel body 1 from the peripheral edge 7b of the left side plate 7A to the upper surface 82 of the connecting member 7C situated in front of the spool (via the chamfered portion 7d and the upper surface 85a) and can smoothly shift to the fishing-line guide operation performed by the finger.

Moreover, according to the embodiment, the upper surface 82 of the connecting member 7C has the curved shape in which the central portion Q sags with respect to the side portions P connected to the side plates (here, the left side plate 7A and the right frame body 7B). Therefore it is possible to effectively prevent the finger 102 from slipping on the connecting member 7C when the angler repeatedly moves the finger 102 in the left-right direction along the connecting member 7C to perform the fishing-line guide operation to wind the line in parallel on the spool (see FIG. 9). Furthermore the angler can know the position of the finger 102 through touches (a contact area of the finger and a pressure on the finger) so that the angler can accurately guide the fishing line with the finger when the line is wound on the spool 3. The upper surface 82 having the U shape can prevent the fishing line from hitting hard thereon and allows the fishing line to be guided smoothly to the spool without being damaged when the line is wound on the spool in parallel.

In the embodiment, the connecting members 7C, 7D respectively have the upper surface 82 and the lower surface 87 that have the above-described curved shape in which the width W2 of the central portion Q in the upper-lower direction is smaller than the width W1 of the side portions P in the upper-lower direction. The thickness of the end portion of the connecting members 7C, 7D situated further from the handle tends to be decreased due to the difference in the outer diameter between the side plates (the left side plate 7A and the right frame body 7B in the embodiment). However, according to the embodiment, it is possible to increase the thickness and thereby it is possible to enhance the rigidity thereof and easily realize the curved upper surface 82 that has the above-mentioned advantageous effect.

Moreover, in the embodiment, the upper surface 82 of the connecting member 7C has the chamfered portion 88, 89 inclined toward the outer surface 80 and the inner surface 81 respectively. Consequently an angler's finger feels comfortable touching the upper surface 82 when performing the line guide operation to wind the line in parallel on the spool, and the angler will not be tired or feel pain even when he/she performs the guide operation for a long period of time.

Embodiments of the present invention are not limited to the above descriptions and are susceptible to various modifications.

For example, the shape of the right side plate, and the arrangement, configuration and the like of the operating member may be adequately changed. The handle is attached on the right side plate in the above embodiment but the handle may be attached on the left side plate instead. In this case, the bowed portions 85 of the connecting members 7C, 7D may be situated on the right side plate side. In addition, configuration of the side plates or the frame is not limited to the above-described embodiment.

What is claimed is:
1. A double bearing reel comprising: a spool rotatably supported between two side plates of a reel body for rotation by a handle provided on one of the side plates, wherein
the side plate situated further from the handle is formed in a circular shape as viewed laterally and an outer diameter of the side plate situated closer to the handle is larger than an outer diameter of the side plate situated further from the handle,
the reel body includes at least one connecting member to connect the side plate situated further from the handle and the side plate situated closer to the handle,
the at least one connecting member includes a front connecting member that connects the side plates in front of the spool, the front connecting member has a planar outer surface facing away from the spool and an inner surface facing the spool, the inner surface is concave, and the front connecting member is connected to the side plate situated further from the handle through a bowed portion.
2. The double bearing reel of claim 1, wherein the bowed portion of the front connecting member has a curved upper surface that is smoothly inclined and connected with a peripheral edge of the side plate situated further from the handle.
3. The double bearing reel of claim 2, wherein the upper surface of the bowed portion smoothly inclines and is continuous with a chamfered portion that is formed on the peripheral edge of the side plate situated further from the handle, and the chamfered portion slants toward the spool.
4. The double bearing reel of claim 1, wherein at least an upper surface of the front connecting member has a curved shape in which a central portion sags with respect to side portions of the connecting member connected to the side plates.
5. The double bearing reel of claim 4, wherein the front connecting member has an upper surface and a lower surface with the curved shape in which a width of the central portion in an upper-lower direction is smaller than a width of the side portions in the upper-lower direction.

6. The double bearing reel of claim 1, wherein an upper surface of the front connecting member has a chamfered portion that slants toward the outer surface and/or the inner surface.

7. The double bearing reel of claim 1, wherein the reel body is configured without a level wind device for winding a fishing-line on the spool in parallel, and a winding operation mechanism that transmits a rotational force of the handle to the spool is provided on the side plate situated closer to the handle.

8. The double bearing reel of claim 1, wherein the side plate situated closer to the handle is formed in a circular shape.

* * * * *